United States Patent
Fuchs

(10) Patent No.: US 9,659,059 B2
(45) Date of Patent: May 23, 2017

(54) MATCHING LARGE SETS OF WORDS

(71) Applicant: salesforce.com, inc., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/847,769

(22) Filed: Sep. 8, 2015

(65) Prior Publication Data
US 2016/0019204 A1    Jan. 21, 2016

Related U.S. Application Data

(63) Continuation-in-part of application No. 13/915,356, filed on Jun. 11, 2013.

(60) Provisional application No. 61/674,171, filed on Jul. 20, 2012, provisional application No. 61/697,494, filed on Sep. 6, 2012.

(51) Int. Cl.
*G06F 17/30* (2006.01)
*G06F 17/27* (2006.01)
*G06F 3/06* (2006.01)

(52) U.S. Cl.
CPC ........ *G06F 17/30477* (2013.01); *G06F 3/067* (2013.01); *G06F 3/0644* (2013.01); *G06F 17/2765* (2013.01); *G06F 17/2795* (2013.01); *G06F 17/3061* (2013.01); *G06F 17/30318* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |

(Continued)

OTHER PUBLICATIONS

U.S. Appl. No. 13/986,251, filed Apr. 16, 2013.

*Primary Examiner* — Huyen Vo
*Assistant Examiner* — Yi-Sheng Wang
(74) *Attorney, Agent, or Firm* — Dergosits & Noah LLP; Todd A. Noah

(57) ABSTRACT

Word phrases are stored in a phrase structure. Each word is stored as a keyword in a keyword structure. Each keyword is associated with usage attributes identifying use of a word in a word phrase. Any preceding words associated with a keyword, and a mapping from any preceding words to a word phrase, is stored for each word. A word string is input. Match attributes are updated in a match structure if a word in the word string matches any keyword and if any preceding words associated with any matching keyword includes a preceding word which precedes the word in the word string. The match attributes indicate use of the matching word in the word string and in a word phrase. Whether a word phrase is present in the word string is determined based on the usage attributes and the match attributes associated with multiple matching words.

20 Claims, 12 Drawing Sheets

900

| Key | Value | Preceding Words Mapped to Phrases |
|---|---|---|
| Albert | (-1,0,0,f,0) | |
| Allen | (0,1,0,t,0) (-1,0,1,f,0) (2,1,2,t,0) (5,2,5,t,1) (6,1,6,t,0) | Albert (0), John (2), Robert (5), Samuel (6) |
| Corporation | (1,2,1,t,0) | Allen Smith (1) |
| John | (-1,0,2,f,0) | |
| Robert | (3,1,3,f,0) (-1,0,5,f,0) | John (3) |
| Samuel | (-1,0,6,f,0) | |
| Smith | (1,1,1,f,0) (3,2,3,t,0) (4,3,4,t,2) | Allen (1), John Robert (3), John (4) | phrase = 1
position = 2
branch = 1
terminal word = true
number of preceding arbitrary word(s) = 0

902

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0101182 A1* | 5/2003 | Govrin ............ G06F 17/30613 |
| 2003/0120675 A1 | 6/2003 | Stauber et al. |
| 2003/0135495 A1 | 7/2003 | Vagnozzi |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0044952 A1* | 3/2004 | Jiang ............... G06F 17/30616 |
| | | 715/256 |
| 2004/0128001 A1 | 7/2004 | Levin et al. |
| 2004/0148284 A1 | 7/2004 | Baker |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0016648 A1 | 1/2007 | Higgins |
| 2007/0040813 A1* | 2/2007 | Kushler ............... G06F 3/0237 |
| | | 345/173 |
| 2007/0136243 A1* | 6/2007 | Schorn ............ G06F 17/30613 |
| 2007/0150800 A1* | 6/2007 | Betz ............... G06F 17/30864 |
| | | 715/206 |
| 2007/0239689 A1 | 10/2007 | Bennett |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0126122 A1 | 5/2011 | Forman |
| 2012/0226776 A1* | 9/2012 | Keebler ............ G06F 17/30578 |
| | | 709/217 |
| 2012/0233137 A1 | 9/2012 | Jakobson et al. |
| 2013/0176127 A1* | 7/2013 | Junqua ............ G06F 17/30292 |
| | | 340/573.1 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

* cited by examiner

| Input word string (word#) | Phrases[0] | Phrases[1] | Phrases[2] | Phrases[3] | Phrases[4] | Phrases[5] |
|---|---|---|---|---|---|---|
| | [0,0,0] | [0,0,0] | [0,0,0] | [0,0,0] | [0,0,0] | [0,0,0] |

FIG. 6A

| | | | | | | |
|---|---|---|---|---|---|---|
| the (0) | [0,0,0] | [0,0,0] | [0,0,0] | [0,0,0] | [0,0,0] | [0,0,0] |

FIG. 6B

| | | | | | | |
|---|---|---|---|---|---|---|
| mailbox (1) | [0,0,0] | [0,0,0] | [1,0,1] | [0,0,0] | [0,0,0] | [0,0,0] |

FIG. 6C

| | | | | | | |
|---|---|---|---|---|---|---|
| exceeds (2) | [1,0,2] | [0,0,0] | [1,0,1] | [0,0,0] | [0,0,0] | [0,0,0] |

FIG. 6D

| | | | | | | |
|---|---|---|---|---|---|---|
| the (3) | [1,0,2] | [0,0,0] | [1,0,1] | [0,0,0] | [0,0,0] | [0,0,0] |

FIG. 6E

| | | | | | | |
|---|---|---|---|---|---|---|
| full (4) | [1,0,2] | [0,0,0] | [1,0,1] | [0,0,0] | [0,0,0] | [0,0,0] |

FIG. 6F

| | | | | | | |
|---|---|---|---|---|---|---|
| limit (5) | [1,0,2] | [0,0,0] | [1,0,1] | [0,0,0] | [0,0,0] | [0,0,0] |

FIG. 6G

| | | | | | | |
|---|---|---|---|---|---|---|
| disabled (6) | [1,0,2] | [0,0,0] | [1,0,1] | [1,1,6] | [0,0,0] | [0,0,0] |

FIG. 6H

| | | | | | | |
|---|---|---|---|---|---|---|
| temporarily (7) | [1,0,2] | [0,0,0] | [1,0,1] | [1,1,6] | [1,2,7] | [0,0,0] |

| Phrase# | Phrase |
|---|---|
| 0 | John Allen |
| 1 | John .* .* Smith |
| 2 | John Robert Smith |
| 3 | Allen Smith Corporation |
| 4 | Robert .* Allen |
| 5 | Samuel Allen |
| 6 | Albert Allen |

| Phrase# | Phrase |
|---|---|
| 0 | Albert Allen |
| 1 | Allen Smith Corporation |
| 2 | John Allen |
| 3 | John Robert Smith |
| 4 | John .* .* Smith |
| 5 | Robert .* Allen |
| 6 | Samuel Allen |

| Phrase# | Phrase |
|---|---|
| 0 | Albert Allen |
| 1 | Allen Smith Corporation |
| 2 | John Allen |
| 3 | ----- Robert Smith |
| 4 | ------ .* .* Smith |
| 5 | Robert .* Allen |
| 6 | Samuel Allen |

FIG. 8C

| Input word string (word#) | Phrases[0] | Phrases[1] | Phrases[2] | Phrases[3] | Phrases[4] | Phrases[5] | Phrases[6] |
|---|---|---|---|---|---|---|---|
| | [0,0,0] | [0,0,0] | [0,0,0] | [0,0,0] | [0,0,0] | [0,0,0] | [0,0,0] |

FIG. 10A

| | Phrases[0] | Phrases[1] | Phrases[2] | Phrases[3] | Phrases[4] | Phrases[5] | Phrases[6] |
|---|---|---|---|---|---|---|---|
| the (0) | [0,0,0] | [0,0,0] | [0,0,0] | [0,0,0] | [0,0,0] | [0,0,0] | [0,0,0] |

FIG. 10B

| | Phrases[0] | Phrases[1] | Phrases[2] | Phrases[3] | Phrases[4] | Phrases[5] | Phrases[6] |
|---|---|---|---|---|---|---|---|
| John (1) | [0,0,0] | [0,0,0] | [1,0,1] | [0,0,0] | [0,0,0] | [0,0,0] | [0,0,0] |

FIG. 10C

| | Phrases[0] | Phrases[1] | Phrases[2] | Phrases[3] | Phrases[4] | Phrases[5] | Phrases[6] |
|---|---|---|---|---|---|---|---|
| Allen (2) | [0,0,0] | [1,0,2] | [1,0,1] | [0,0,0] | [0,0,0] | [0,0,0] | [0,0,0] |

FIG. 10D

| | Phrases[0] | Phrases[1] | Phrases[2] | Phrases[3] | Phrases[4] | Phrases[5] | Phrases[6] |
|---|---|---|---|---|---|---|---|
| Smith (3) | [0,0,0] | [1,1,3] | [1,0,1] | [0,0,0] | [0,0,0] | [0,0,0] | [0,0,0] |

FIG. 10E

| | Phrases[0] | Phrases[1] | Phrases[2] | Phrases[3] | Phrases[4] | Phrases[5] | Phrases[6] |
|---|---|---|---|---|---|---|---|
| Corporation (4) | [0,0,0] | [1,1,3] | [1,0,1] | [0,0,0] | [0,0,0] | [0,0,0] | [0,0,0] |

FIG. 10F

MATCHING LARGE SETS OF WORDS

CLAIM OF PRIORITY

This application is a continuation-in-part of U.S. patent application Ser. No. 13/915,356 filed Jun. 11, 2013, which claims priority from U.S. Provisional Patent Application No. 61/674,171 filed Jul. 20, 2012 and U.S. Provisional Patent Application No. 61/697,494 filed Sep. 6, 2012, both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the records of the United States Patent and Trademark Office, but otherwise reserves all rights.

TECHNICAL FIELD

The subject matter disclosed herein relates generally to database records management, and more particularly, to techniques for recognizing particular words in word strings.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

In conventional database systems, users access data resources from a single logical database. Typically, data is retrieved from and stored to the database using the computing systems or devices of the user. For example, a user system remotely accesses one of a multiple servers that in turn accesses a database, the user issues a query to the database to retrieve data, and the database processes the query and returns information from the database, which is relevant to the query, to the user. Maintaining a database to retrieve and deliver accurate information to a user in a timely and efficient manner has been and continues to be a goal of database system administrators.

In a multi-tenant database system, various elements of hardware and software of a database may be shared by one or more customers through "cloud computing" solutions which allow service providers to offer access to hardware/software systems through a network, such as the Internet. For example, an application server may be configured to simultaneously process multiple requests for many different customers, and a database may be configured to store data that is shared by many different customers.

Customers of database systems demand up-to-date, comprehensive data. For example, sales and marketing organizations need accurate and up-to-date contact information to maintain good relations with existing customers as well as solicit leads for new customers. Unfortunately, conventional database systems rely on individuals to maintain their own contact information, and therefore, even within a single organization, multiple individuals may have inconsistent and/or inaccurate contact information.

An advantage of a multi-tenant database system is that business enterprises may share data resources, and rely on the multi-tenant database system provider to maintain the data, such as personal and/or business contact information. Another advantage is that all personnel within a single enterprise have access to the exact same contact information, so that inaccuracies or inconsistencies within the organization no longer exist.

When a customer discovers a problem with stored data in a multi-tenant database system, such as the failure of an attempted delivery of an email, the customer may contact a multi-tenant database system to report the problem. The multi-tenant database system, using automated machine techniques and/or administrator intervention, may attempt to solve the problem and update its stored information, if appropriate.

For example, error messages, such as "invalid mailbox" or "mailbox full," are usually returned by an email server when there is a problem with the specified email address. These messages can be useful in determining what type of action to take to solve a problem. Most conventional techniques for string recognition rely on examining strings of characters, one character at a time, to characterize or match the strings to known strings. Such techniques can be slow and inefficient.

BRIEF DESCRIPTION OF THE DRAWINGS

In the following drawings, like reference numbers are used to refer to like elements. Although the following figures depict various examples, the one or more implementations are not limited to the examples depicted in the figures.

FIGS. 6A-6I illustrate the sequential states of an intermediate results array during processing of an example input word string using the process of FIG. 3;

FIG. 8A illustrates a table of search phrases; FIG. 8B illustrates the table of FIG. 8A sorted alphabetically; and FIG. 8C illustrates the sorted table of FIG. 8B with redundant words eliminated;

FIGS. 10A-10F illustrate the sequential states of an intermediate results array during processing of an example input word string using the process of FIG. 7;

DETAILED DESCRIPTION

1. Overview

One aspect of maintaining a network interconnected system involves processing error messages or other messages from various external sources, where the messages are strings of multiple words, wherein any references to words may also refer to tokens which are not necessarily recognized as words. For example, a database application may be used for business contacts, and one or more email lists may be sold to customers for use in marketing campaigns. A customer may provide the email lists to a mass email servicer, who returns one or more "bounce" files to the customer describing email deliveries that failed. The customer then passes the bounce files back to the database application for handling and correction.

Email deliveries may fail for many reasons, and such failure is usually indicated by an error message having a format with several discrete information fields, such as <email_address> <message#> <descriptive_phrase>. Deciphering the descriptive phrases enables proper action to be taken by the database application to correct identified errors.

Over time, a network interconnected system such as a database application sees the same or similar messages repeatedly. Thus, a phrase-based data structure can be constructed to store a list of search phrases encountered in error messages, bounce files, or other scenarios. Such a structure may be used as a reference for analyzing or comparing input word strings. Further, each unique word in the search phrases may be indexed in a keyword-based data structure, such as a keyword table, where each word is a keyword and is mapped to one or more values that describe attributes of using the keyword in one or more of the search phrases. Using the keyword table and the list of search phrases, a temporary match-based array may be used to keep track of possible matches between words in an input word string and the list of search phrases.

2. Simplified System Description

As used herein, the term multi-tenant database system refers to those systems in which various elements of hardware and software of the database system may be shared by one or more customers. For example, an application server may simultaneously process requests for a large number of customers, and a database table may store rows of data for a potentially much larger number of customers. Although embodiments herein are described within the context of a multi-tenant database system, such embodiments may also be practiced within other database systems. As used herein, the term query refers to a set of steps used to access information in a database system.

Figure 1:
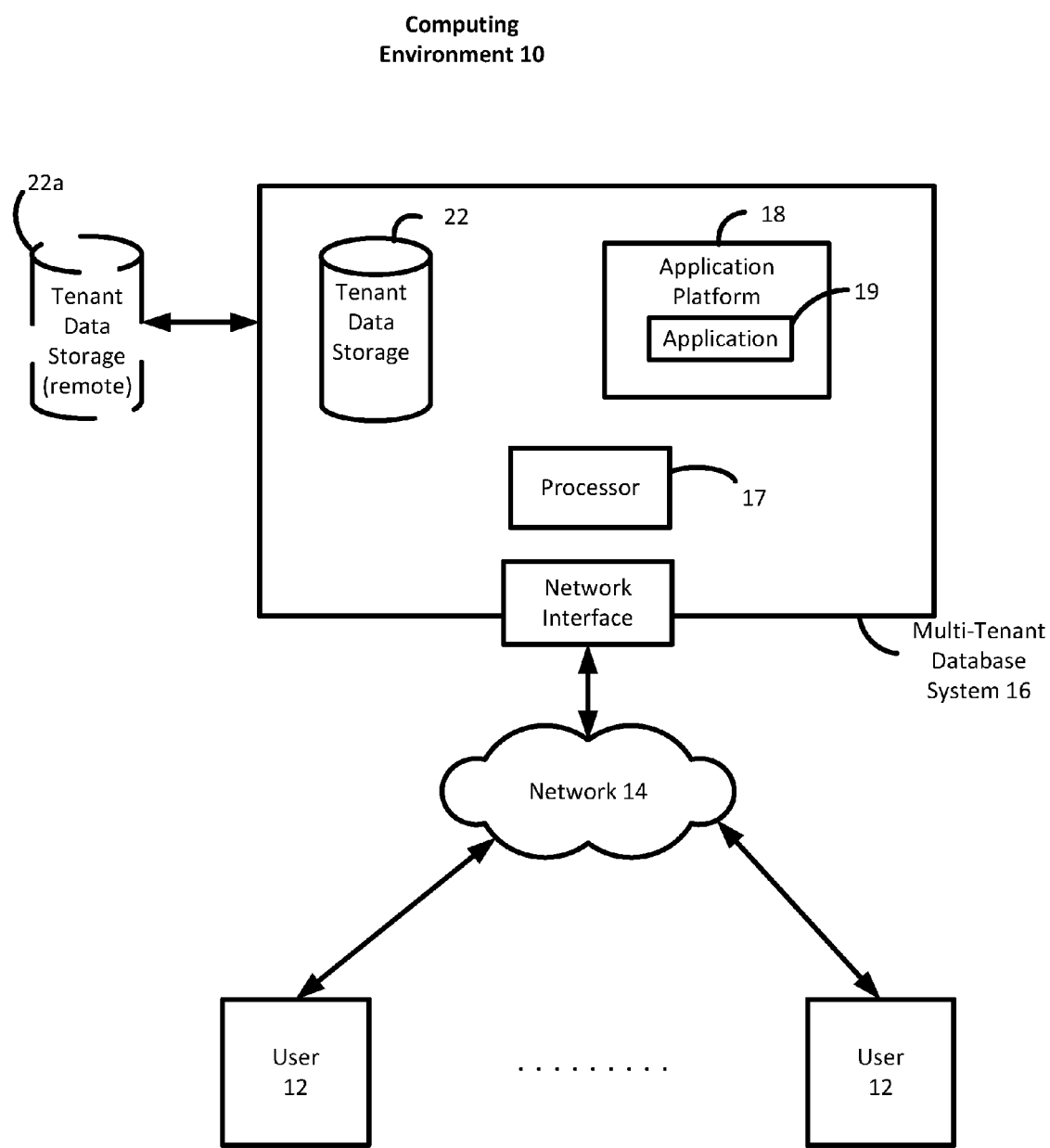
FIG. 1 is a simplified block diagram illustrating a multi-tenant database system.
Figure 11:
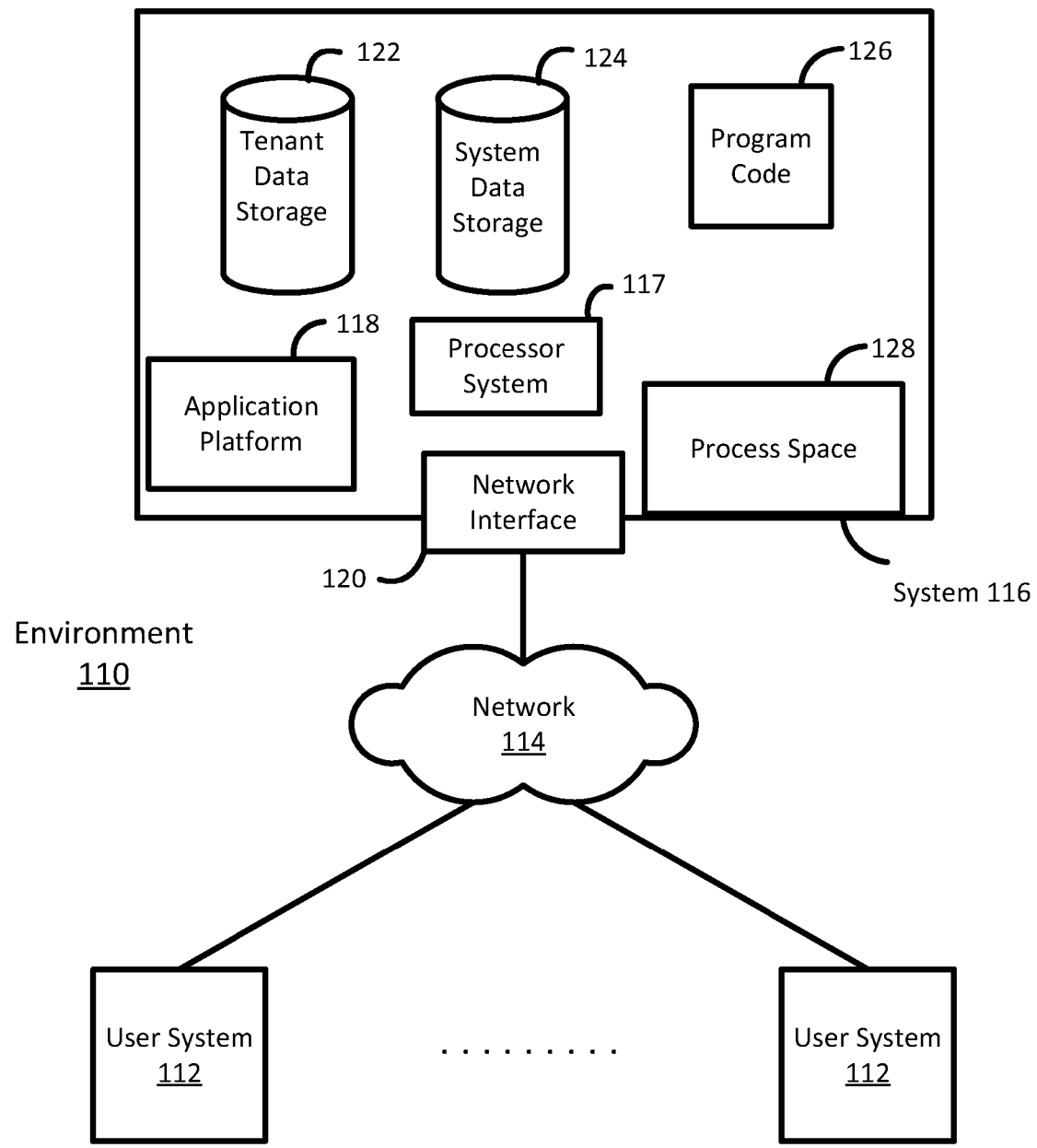
FIG. 11 illustrates a block diagram of an example of an environment wherein an on-demand database service might be used.
Figure 12:
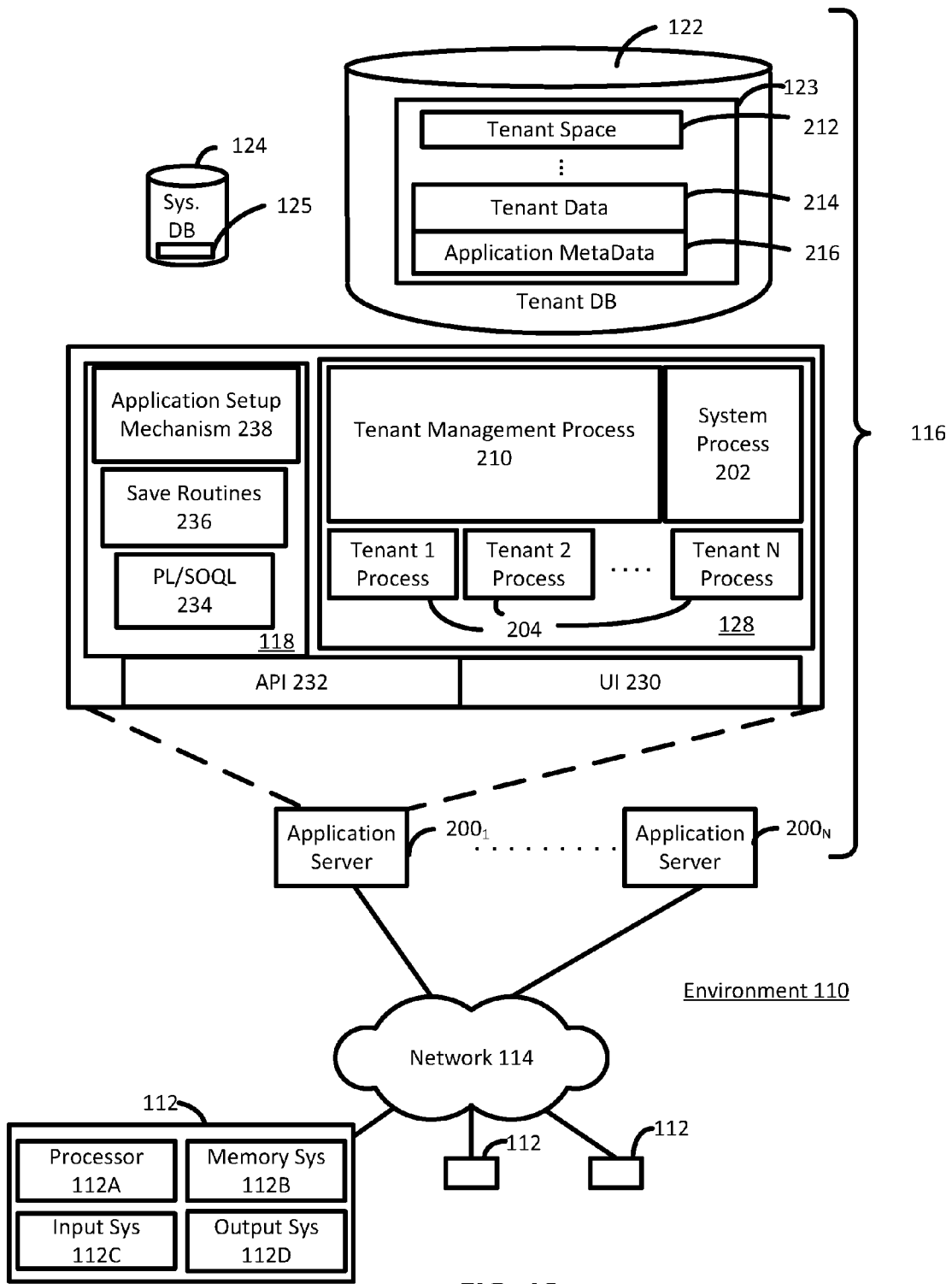
FIG. 12 illustrates a block diagram of an embodiment of elements of FIG. 7 and various possible interconnections between those elements.

FIG. 1 illustrates one embodiment of an on-demand, multi-tenant database system 16 operating in a computing environment 10. User devices or systems 12 access and communicate with the multi-tenant database system 16 through network 14 in a known manner. More detailed examples for implementing the multi-tenant database system 16 are shown in FIGS. 11 and 12, described below. For example, the user devices 12 may be any type of processor-based computing device, such as a desktop, laptop, tablet, smartphone, etc. The network 14 may be any type of processor-based computing network, such as the Internet, local area network, wide area network, etc. The operation of the multi-tenant database system 16 is controlled by a central processor system 17 running a suitable operating system.

The multi-tenant database system 16 provides the user systems 12 with access to many features and applications available on or through the multi-tenant database system 16. In particular, the multi-tenant database system 16 includes tenant data storage 22, which is configured through the multi-tenant database system 16 to maintain tenant data for multiple users/tenants, as further described below. The tenant data storage 22 may be physically incorporated within the multi-tenant database system 16, or configured as remote storage 22a (shown in dashed lines), likewise accessible and useful to the multi-tenant database system 16 to support the user systems 12. The multi-tenant database system 16 is designed to facilitate storage and organized access to many different types of tenant data.

One important objective for the administrator of the multi-tenant database system 16 is to maintain accurate, up-to-date, and detailed information in its database. For example, for a multi-tenant database system that stores contact data, a user/customer may report errors in the data via a report to the database administrator. A unique feature of the multi-tenant database system 16 described herein is one or more applications 19, managed and operated by the multi-tenant database system 16 through its application platform 18, that facilitate this objective by providing one or more sets of program instructions providing features to help maintain and secure the accuracy and reliability of the stored data, as well as enhance the data where possible. For example, in one embodiment described herein, instructions are provided for analyzing strings of words, rather than strings of letters, in order to recognize commonly used phrases. For example, a typical email system generates search phrases such as "invalid mailbox" or "mailbox full" when an email delivery fails. Quick recognition of these search phrases allows the system to efficiently take appropriate action, in many cases through machine-learned responses.

Figure 2:
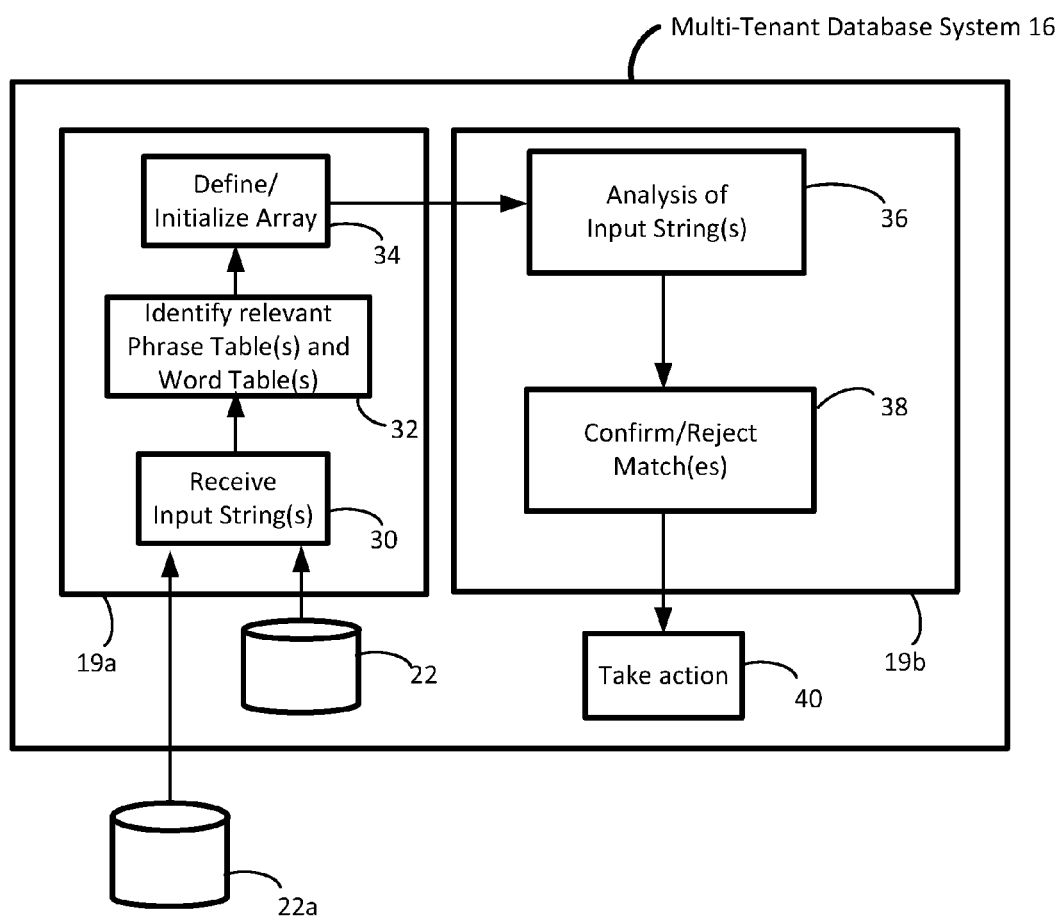
FIG. 2 is a block diagram illustrating the operational flow caused by program instructions for phrase matching on input word strings.

The block diagram shown in FIG. 2 illustrates the operation of an application 19a that performs initial handling of an input word string and simple pre-processing steps, and a corresponding application 19b, which handles the main analysis and processing steps of a method for matching collections of words in the input word string to one or more search phrases. Although two applications 19a and 19b are shown as part of the multi-tenant database system 16, these applications may implemented as integrated or discrete parts or modules, and may also be located elsewhere, but accessible to the multi-tenant database system 16. Also, the construction of suitable program code and interaction between different code modules can vary greatly according to need and/or desire and software platform, and thus the illustrated embodiments are not intended to limit how various software solutions may be implemented.

In the application 19a, a first program module 30 has program code suitable to receive input word strings from data storage 22, or from an external source 22a, for analysis. A second program module 32 includes program code to identify the relevant keyword table(s) and phrase table(s) to use for the analysis of the input word string(s). The keyword table(s) and phrase table(s) are created or predefined ahead of time for use in the analysis. The phrase tables list search phrases for one or more particular applications. The keyword tables list the unique words from the search phrases as keywords, and also summarize the attributes of the word in a phrase as the value corresponding to the keyword. A third program module 34 defines and initializes an intermediate storage array, which is used to keep track of possible phrase matches.

Once the pre-processing steps are completed, then analysis of an input word string is performed by program code in the analysis module 36 of application 19b. The analysis module 36 evaluates one word of the input word string at a time, using the keyword table as a reference, and keeping track of possible matches in the intermediate storage array. In program module 38, the possible matches from the analysis step are confirmed or rejected. Finally, in program module 40, a defined action may be taken in correspondence with a matched phrase. For example, an error message with a match for the phrase "invalid mailbox" might be directed to a specific handling unit to research and correct an erroneous email address.

3. Process for Phrase Matching

In embodiments described herein, a technique is disclosed for recognizing phrases in an input word string using keywords in a keyword table. One or more values are stored in correspondence with each keyword, and the values provide information about use of the keyword in frequently recorded or search phrases. An intermediate storage array is used to keep track of possible matches and is indexed to correspond with a specific phrase in the phrase table. Advantageously, the technique targets strings of words rather than strings of letters.

Figure 3:
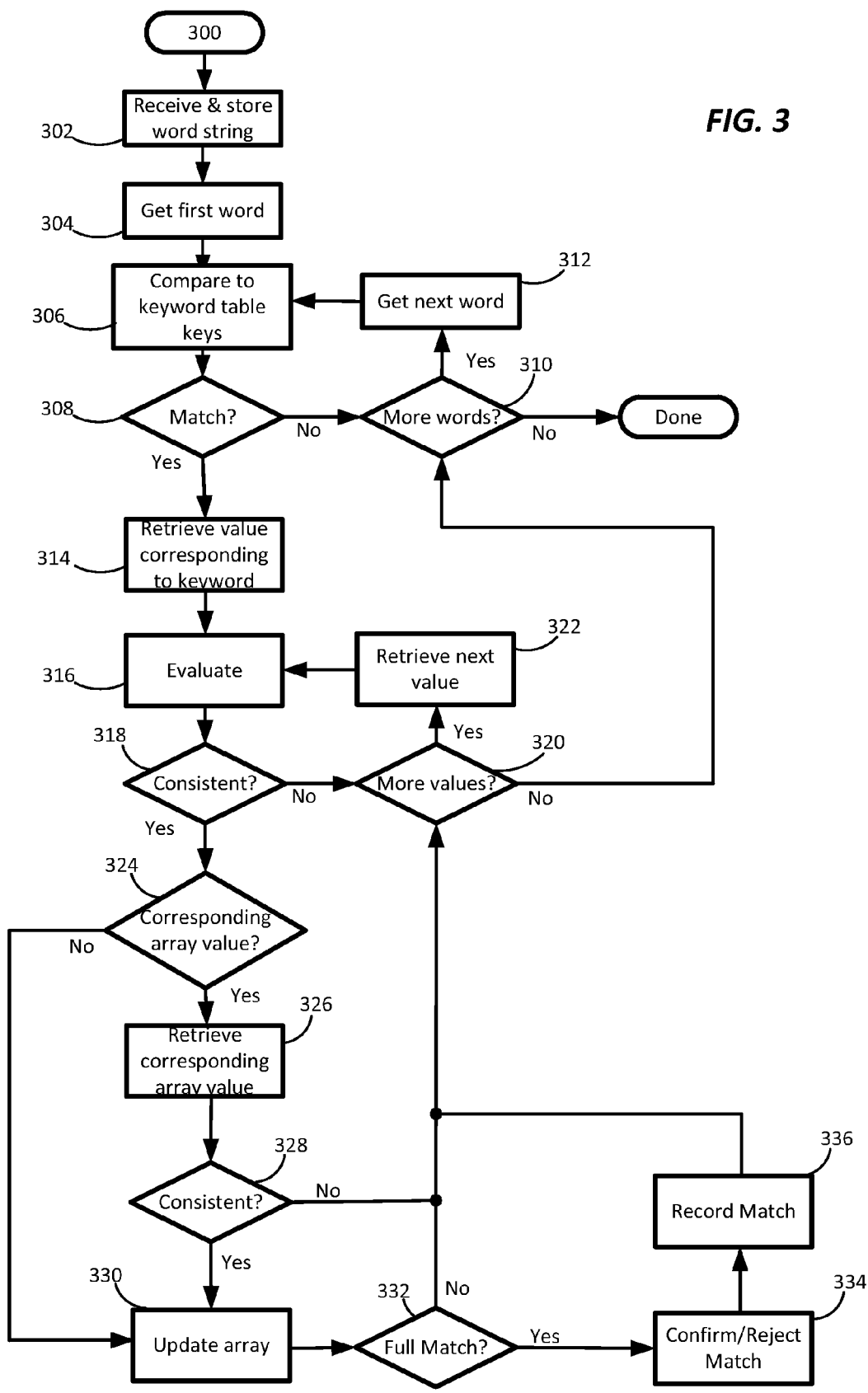
FIG. 3 is a flow chart illustrating an example process for phrase matching on input word strings.

Referring now to FIG. 3, a process 300 is illustrated for analyzing input word strings. In step 302, an input word string having multiple words is received and placed into a temporary buffer. In step 304, the first word of the input word string is retrieved from the buffer. In step 306, the word is compared to the keywords in a keyword table. The keyword table is a defined structure storing multiple keywords and corresponding values, and the construction of the keyword table is described in more detail in Section 5 below. Each keyword represents a unique word from a list of search phrases and may occur in multiple phrases. One or more values may be stored in correspondence with each keyword in the keyword table. Each value is an actually an array of several discrete values, where each discrete value in the array describes a specific attribute of the keyword in the list of search phrases. For example, one of the attributes is the phrase number in the list of search phrases in which the keyword appears.

If the word does not match a keyword in the keyword table in step 308, then if the input word string has more words in step 310, the next word is retrieved from the buffer in step 312 and the comparison step 306 is repeated with the next word. If there are no more words in the input word string in step 310, then the process ends.

If the word matches a keyword in the keyword table in step 308, then the corresponding value for the keyword is retrieved from the keyword table in step 314. The retrieved value is evaluated in step 316, at least in part, to determine if the use of the word from the input word string is consistent with the attributes represented by the keyword table value. If the use of the word in the input word string is not consistent with the attributes represented by the keyword table value in step 318, then if more keyword table values are present for this keyword in step 320, then the next keyword table value is retrieved in step 322, and evaluated in step 316. If there are no more keyword table values in step 320, then the process returns to step 310 to see if there are more words in the input word string to analyze.

If the use of the word in the input word string is consistent with the attributes represented by the keyword table value in step 318, then if there is a corresponding value in the intermediate storage array in step 324, it is retrieved in step 326. The intermediate storage array is used to keep track of possible matches. If the use of the word in the input word string is consistent with the value from the intermediate storage array in step 328, then the array is updated in step 330. A check is made in step 332 to see whether a match has been identified. If so, then the match is confirmed or rejected in step 334, and if confirmed, is recorded in step 336. Thereafter, the process returns to step 320 to see if there are more possible matches to analyze for the current word.

If the use of the word in the input word string is not consistent with the value from the intermediate storage array in step 328, then there is no match, and the process returns to step 320 to see if there are more values to consider.

If the use of the word in the input word string is consistent with the attributes represented by the keyword table value in step 318, but there is no corresponding value in the intermediate storage array in step 324, then the intermediate array is updated in step 330 to reflect attributes of using the word in the input word string. A match is then considered likely in step 332, which may be confirmed or rejected in step 334.

4. Building a Phrase Table

A keyword table (or word map) is a convenient and well-known data structure for mapping keywords to values. In one embodiment, a keyword table is defined to index words as keywords for commonly encountered phrases, and one or more values are stored with each keyword as a list of entries that are determined from analysis of the relevant word strings, such as the list defining attributes relating to use of the word in the search phrase(s).

Figure 4A:
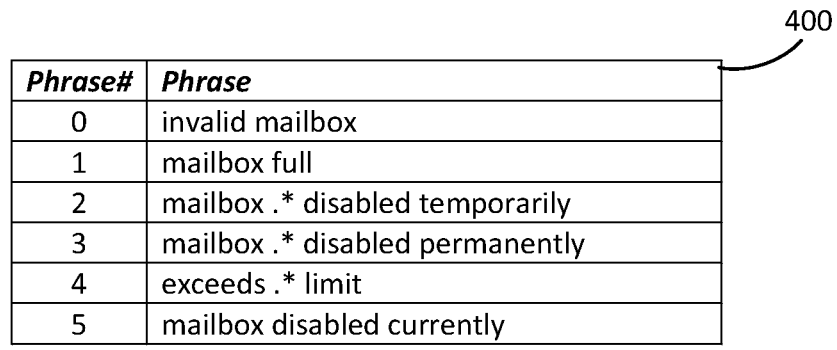
FIG. 4A illustrates a table of search phrases.

For example, consider the six phrases numbered 0 through 5 and shown in Table 400 of FIG. 4A, which include the phrase "invalid mailbox" as phrase 0 and the phrase "mailbox full" as phrase 1. The phrases are numbered starting with "0" rather than "1," consistent with computer-based references. These phrases are search phrases that may be encountered by an application, for example, as generated by an email application in response to an error detected in an email delivery operation. This is only intended as an illustrative example, as there are many common expressions or phrases that can be generated by a computer operating system, an application, a peripheral device, a network, or virtually any other computing device or person generating text, such as a newsfeed, and the techniques described herein have broad applicability to any need for phrase recognition in such applications. One or more sets of search phrases may be developed and stored in a database, for example, to use for analysis of input word strings of multiple words.

Figure 4B:
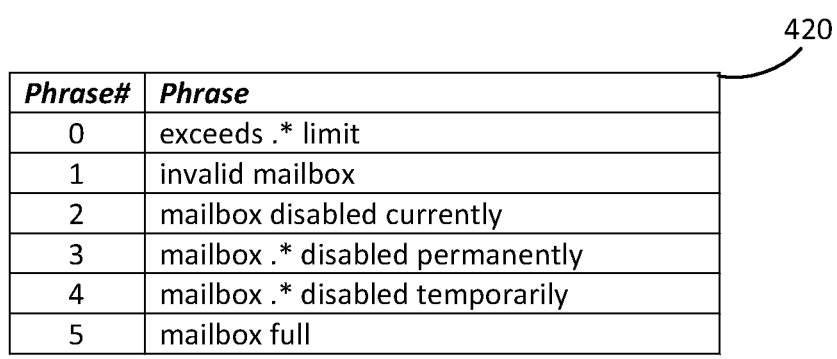
FIG. 4B illustrates the table of FIG. 4A sorted alphabetically.

The phrases listed in table 400 of FIG. 4A may be sorted alphabetically, resulting in the sorted list of word strings shown in table 420 of FIG. 4B. Further, the alpha-sorted phrases in FIG. 4B may be further simplified by removing common terms from subsequent phrases, resulting in the sorted simplified list shown in table 440 of FIG. 4C, where a common non-alphanumeric symbol, such as a dash character "--", replaces the redundant terms in similar phrases, for example, as shown in phrases 3 through 5 in FIG. 4C.

The use of the dash character "--" replaces redundancy in similar phrases, and indicates a branch condition. For example, rather than have a single letter correspond to a single node as in a simple tree, at least an entire word or phrase may correspond to a single node.

5. Building a Keyword Table

Figure 4C:
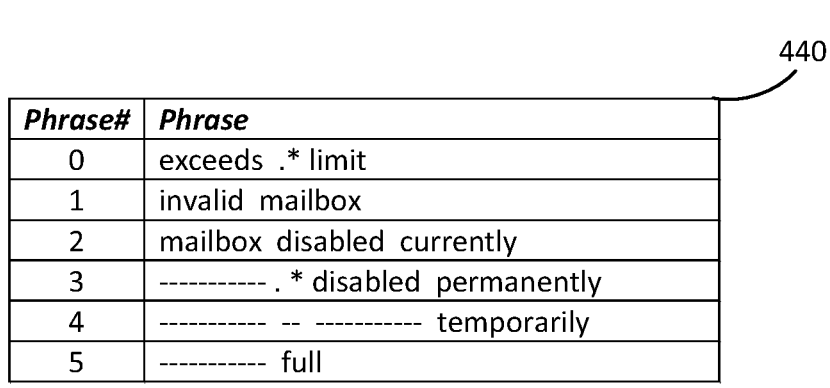
FIG. 4C illustrates the sorted table of FIG. 4B with redundant words eliminated.
Figure 5:
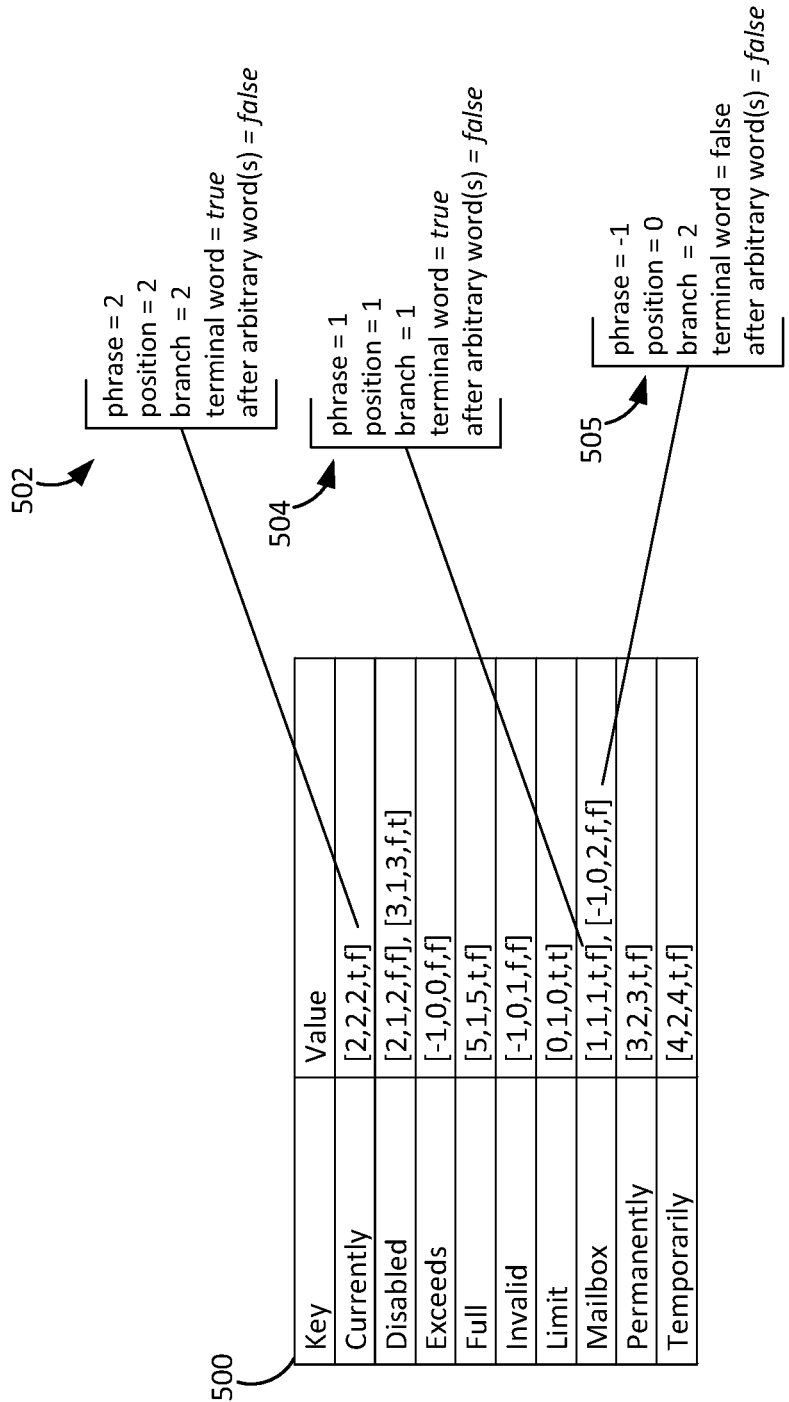
FIG. 5 illustrates a keyword table with each unique word from the table of FIG. 4C stored as a keyword, and each keyword mapped to one or more corresponding values describing attributes of the keyword in the corresponding common word phrase.

From the sorted simplified list shown in FIG. 4C, a keyword table can be built as shown in table 500 in FIG. 5, with each word from the phrases shown in FIG. 4C being indexed as a keyword in the keyword table. The corresponding value for each keyword is shown as a list of bracketed values, for example, [a,b,c,d,e], the values representing attributes of the words of the search phrases. In one example, the list entries [a,b,c,d,e] are specified as [a] the phrase number containing the word; except, if the word is the first word in the phrase, then the phrase number will be set equal to "−1" as a special designator; [b] the position of the word in the phrase; [c] the branch phrase number; [d] whether the word is the terminal word in the phrase; and [e] whether the word follows any arbitrary word(s), which may be represented by the characters ".*"

Thus, the first row of the keyword table stores the keyword "currently," and the corresponding value "[2,2,2,t,f]." FIG. 5 includes a "callout box" 502 which describes each attribute of the keyword table value. Thus, the first value "2" indicates that "currently" appears in the third phrase in FIG. 4C; the second value "2" indicates that "currently" is the third word in that phrase; the third value "2" indicates that "currently" appears in the third branch, or the third phrase; the fourth value "t" indicates that "currently" is the terminal word in the phrase; and the fifth value "f" indicates that "currently" does not follow any arbitrary words. FIG. 5 also includes callout boxes 504 and 505 that similarly describe each attribute of both keyword table values for the keyword "mailbox." One or more keyword tables can thus be constructed to index lists of search phrases, for example, to facilitate processing for a computing application, such as database management.

6. Example Analysis of Word Strings

In order to analyze an input word string using the keyword table(s), a match-based array is defined to store intermediate values. For example, the array phrases[ ] may be defined for use with the phrase table 440 of FIG. 4C and the keyword table 500 of FIG. 5. Since there are six phrases in the phrase table 440, the array will be defined to have a length of six, and each position in the array will be indexed to a phrase in the phrase table. Further, each position of the array will have a value [x,y,z], where x=the sentence number for the input word string (where each new sentence has a subsequent value, starting with 1), y=the position of the word in the search phrase, and z=the position of the word in the input word string. Since this array may be very large, in some embodiments the array is not initialized more than once. At the start of operations, every array value has been zeroed out, but if there are any matching phrases, doing so after each input sentence may not be efficient. Therefore when the algorithm evaluates a value in the array, the algorithm evaluates the input sentence number. If the input sentence number is less than the current input sentence number, then that updated array value is from a previous input sentence, and not the current input sentence, such that the algorithm can ignore and overwrite the array value. Therefore, the array does not need to be reinitialized. If the input is by sentence, then the algorithm counts sentences. But if the input is by article or document, then an article or a document is the unit of the input For the sake of brevity and ease of handling, the array may be initialized with objects [0,0,0] in all positions.

For an example, the following input word string is received as an error message: "the mailbox exceeds the full limit disabled temporarily." This word string may be analyzed one word at a time against the keywords stored in the keyword table of FIG. 5 using the process 300, and the progress of such analysis is illustrated with reference to FIGS. 6A-6I. As noted above, the intermediate array phrases[ ] may be initialized with object values [0,0,0] in all positions, as shown in FIG. 6A.

The first word in the input sentence is "the," and since this word does not appear as a keyword in the keyword table, it is ignored and the next word in the input word string is evaluated. All values in the array phrases[ ] remain unchanged as shown in FIG. 6B.

The second word in the input word string is "mailbox" and is located as a keyword in the keyword table with two value entries, indicating that the word appears in multiple phrases in the phrase table of FIG. 4C. Each value entry is considered in turn.

The first value for the keyword "mailbox" in the keyword table is [1,1,1,t,f]. This value indicates that for the second phrase in FIG. 4C, the word "mailbox" is in the second position, which is consistent with the word "mailbox" in the input word string, and this value also indicates that the word "mailbox" is the terminal word, and that the word "mailbox" cannot be the initial word. The corresponding array value for the second phrase, e.g., phrases[1] is examined. That value is [0,0,0] as indicated in FIG. 6B, such that this initialized value indicates that no word match has been identified yet for the second phrase. Consequently, if "mailbox" is the terminal word for the second phrase, then "mailbox" is also the initial word for the second phrase, but the keyword table value indicates that "mailbox" cannot be the initial word for the phrase. Therefore, the first value for the keyword "mailbox" in the keyword table does not indicate any possible match.

The second value entry for "mailbox" in the keyword table is [−1,0,2,f,f]. This value indicates that "mailbox" is in the first position in the third phrase, which could be correct, and therefore the value [1,0,1] is stored to phrases[2] to keep track of the possible use of "mailbox" in the first input word string as the first word of a phrase, as well as the fact that the word is in the second position of the input word string, as shown in FIG. 6C. That is, the array keeps track of a possible match, depending on what follows, with the third phrase where "mailbox" is the first word in the phrase.

The third word in the input sentence is "exceeds." The word is located in the keyword table with a value of [−1,0,0,f,f]. The keyword table value indicates that the word "exceeds" is in the first position for the first phrase in the phrase table of FIG. 4C. This may be also true for the word "exceeds" in the input word string, depending on what follows. The value phrases[0] is examined, but it still has the initialized value [0,0,0] at this point, and therefore it is updated to [1,0,2] as shown in FIG. 6D; that is, the intermediate array is updated at phrases[0] to keep track of the possible use of "exceeds" in the first input word string as the first word of a phrase, as well as the fact that the word is in the third position of the input word string.

The fourth word in the input word string is "the" again, which is not in the keyword table, so it is ignored and the next word evaluated, with the phrases[ ] array remaining unchanged as shown in FIG. 6E.

The fifth word in the input sentence is "full," which is found in the keyword table with a value of [5,1,5,t,f]. The keyword table value indicates that the word "full" is in the second position of the sixth phrase of FIG. 4C. The value for phrases[5] is examined, which reveals the initialized value [0,0,0] is still stored there. However, the sixth phrase in FIG. 4C does not allow for any arbitrary words between the words "full" and any preceding words. Therefore, the word "full" would only result in a match if it were the next word after "mailbox" in the sixth phrase, and it is not the next word after "mailbox" in the input word string, so the analysis moves on and the array phrases[ ] remains unchanged as shown in FIG. 6F.

The sixth word in the input sentence is "limit," which is found in the keyword table with the value [0,1,0,t,t]. The keyword table value indicates that the word "limit" is in the second position of the first phrase in FIG. 4C. Therefore, phrases[0] is examined, which has the value [1,0,2]. The value of phrases[0] indicates that the possible matching "limit" should be the second word in the phrase, which is consistent with the first phrase in FIG. 4C, and the keyword table value also indicates that the word "limit" could follow arbitrary words and is the terminal word in the phrase. These indicators are all consistent with a match for the first phrase, phrase[0]="exceeds.* limit," and no changes are made to the array phrases[ ], as shown in FIG. 6G, but the phrase 0 is recorded as having been matched. Since the word "exceeds" is the initial word in the first phrase and the word "limit" is the terminal word in the first phrase, with possible arbitrary words between them, and the input word string has the word "exceeds" followed by arbitrary words which are followed by the word "limit," the words in the input word string from "exceeds" to "limit" are a complete match for the first phrase, such that no words before "exceeds" or after "limit" need to be identified to match the first phrase.

The seventh word in the input sentence is "disabled," which is found in the keyword table with two different values. The first keyword table value is [2,1,2,f,f]. This first keyword table value indicates that the word "disabled" is in the second position of the third phrase in FIG. 4C. However, the keyword table value also indicates that the word "disabled" does not follow any arbitrary words, and since the word "limit" precedes "disabled" in the input word string, and the word "mailbox" precedes the word "disabled" in the third phrase, there is no match.

The second keyword table value for "disabled" is [3,1,3, f,t], which indicates the second position of the fourth phrase in FIG. 4C. The keyword table entry also indicates that the word may follow arbitrary words, and therefore results in a match for the fourth phrase, namely "-------- .* disabled permanently." The value for phrases[3] is still the initialized value [0,0,0]. Therefore, the value [1,1,6] is stored at phrases [3]; that is, the intermediate array is updated at phrases[3] to keep track of the use of "disabled" in the first input word string as the second word of a phrase and the seventh word of the input word string.

The eighth and final word in the input word string is "temporarily," which is found in the keyword table with the value [4,2,4,t,f]. The keyword table value indicates that the word "temporarily" is the third word in the fifth phrase and is a terminal word. The value for the corresponding array phrases[4] is still the initialized value [0,0,0]. Since a possible match exists, thus the value [1,2,7] in entered into phrases[4] as shown in FIG. 6I; that is, the intermediate array is updated at phrases[4] to keep track of the use of "temporarily" in the first input word string as the third word of a phrase, namely "-------- .* -----temporarily," and the eighth word of the first input word string. The first set of dashed characters in the fifth phrase represents the redundant word "mailbox," which was identified as an initial word which matches the third phrase, which serves as a root for the fifth phrase. The second set of dashed characters in the fifth phrase represents the redundant word "disabled," which was identified as a word following arbitrary text, which matches the fourth phrase, which serves as a root for the fifth phrase. Since the word "temporarily" is identified as a terminal word which matches the fifth phrase, the possible matches identified for the third, fourth, and fifth phrase combine together to result in a match for the fifth phrase "mailbox.* disabled temporarily," complete with initial and terminal words. Thus, the analysis has revealed that words of the input word string create a match with both the first phrase in FIG. 4C and the fifth phrase of FIG. 4C.

7. Process for Phrase Matching of Large Sets

The process 300 for matching phrases, as described above and depicted in FIG. 3, may be extended to support matching on a large scale, such as matching against tens of millions of entities simultaneously from multiple organizations. An example use case is identifying the known entities in a set of documents. Another example use case is identifying which users from different systems may be interested in which articles referencing document entities, such as persons or companies, which may be matched to database entities. Matching a record against a database differs from matching entities in documents against database entities. When matching a record against a database, what is a first name, what is a last name, and what is an address are known in advance. When matching entities in documents against database entities, which words in the documents correspond to which fields of which database entities is not at all clear. Although building the same types of phrase tables, keyword tables, and intermediate match arrays, as described above, may be applicable for matching large sets, challenges remain for using the process 300 for matching large sets. For very large sets of phrases, the same word may appear in the same position in many phrases, and it is necessary for the process 300 to check every word from every phrase. For example, a names database may have many first names for any given last name, such as Allen Smith, John Smith, etc. The process 300 creates a phrase for each first name-last name combination and checks every phrase when Smith appears as a last name.

Figure 7:
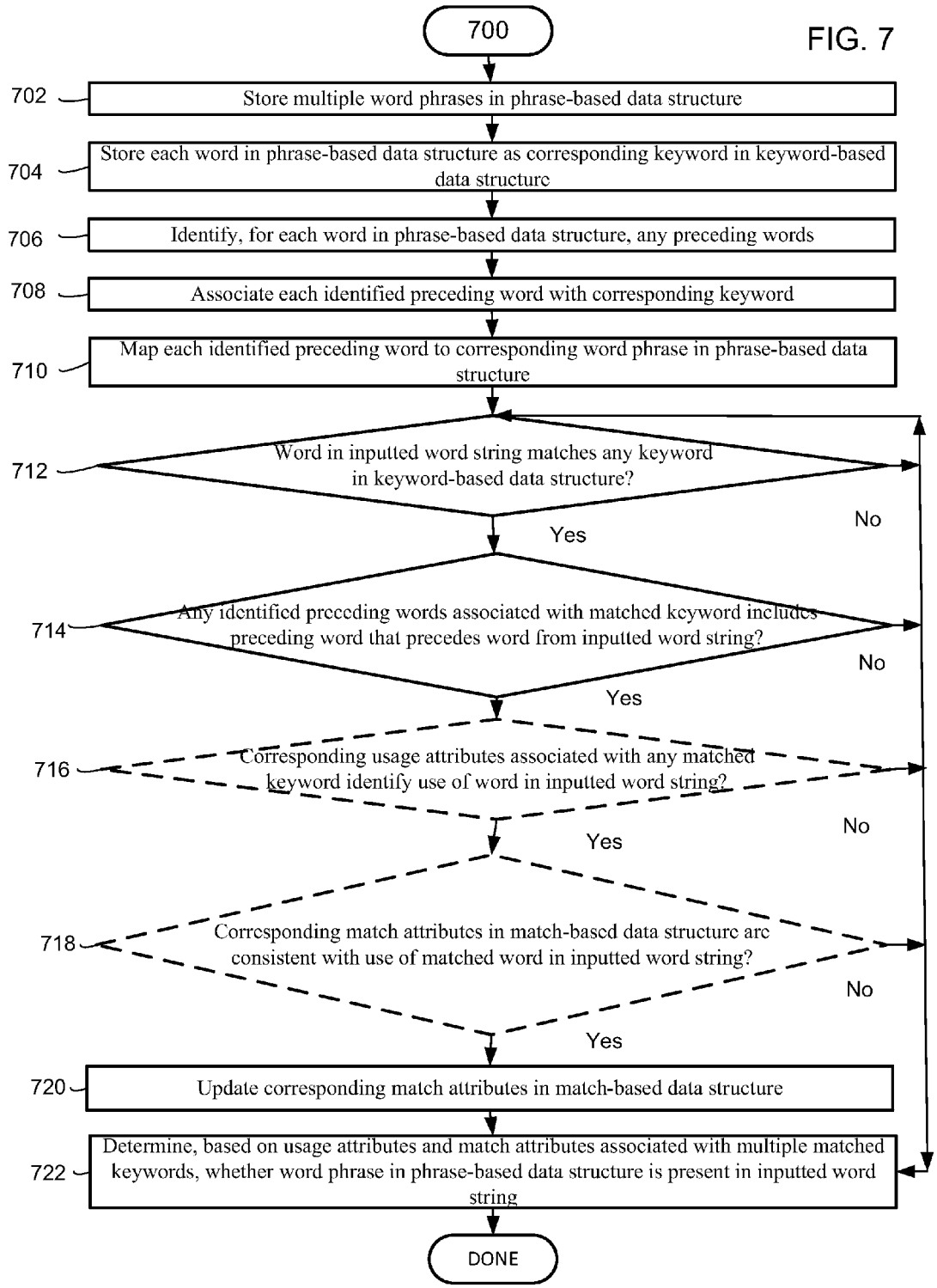
FIG. 7 is a flow chart illustrating an example process for phrase matching on input word strings for large sets.
Figure 9:
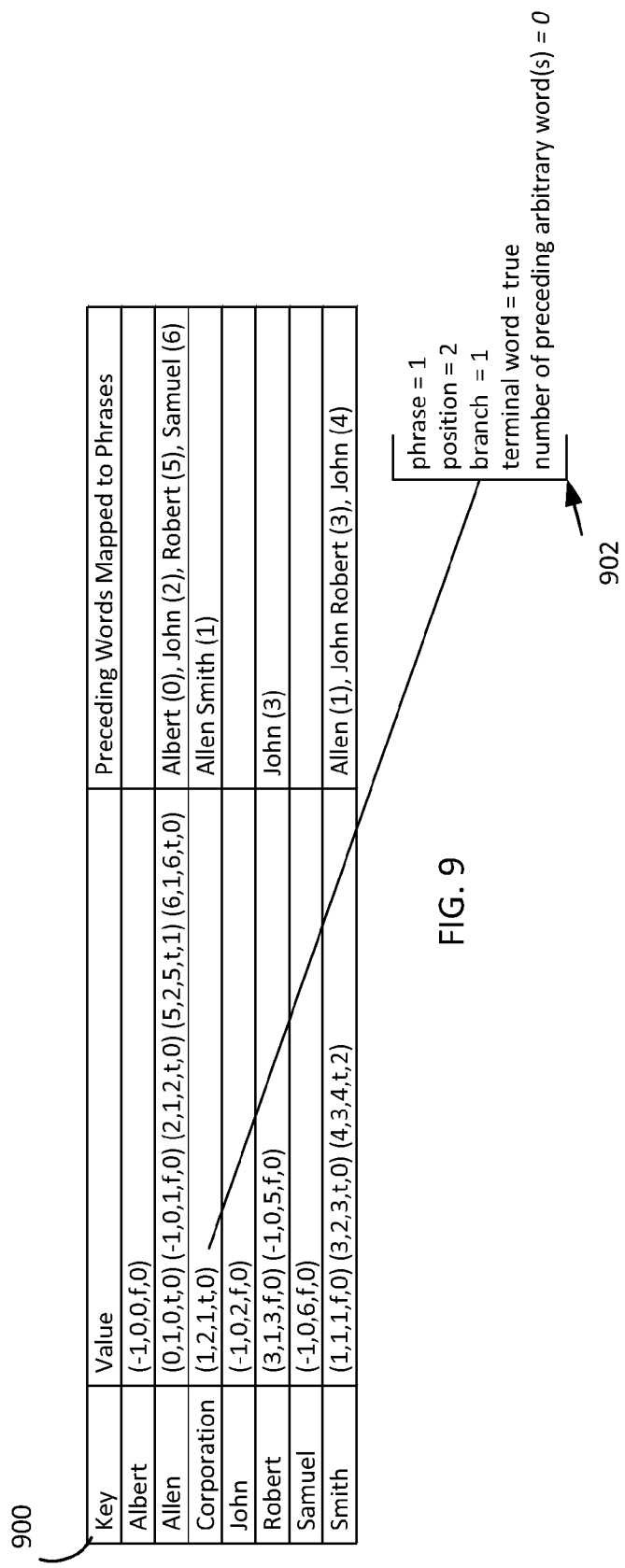
FIG. 9 illustrates a keyword table with each unique word from the table of FIG. 8C stored as a keyword, and each keyword mapped to at least one corresponding value describing attributes of the keyword in the corresponding common word phrase.

Referring now to FIG. 7, a process 700 is illustrated for analyzing input word strings for large set matching. In step 702, phrases are stored in a phrase-based structure, similar to the phrase-based structures described above in reference to FIGS. 4A-4C, and similar to the phrase-based structures described below in reference to FIGS. 8A-4C. In step 704, each word in the phrase-based structure is stored as a keyword in a keyword-based structure, similar to the keyword-based structure described above in reference to FIG. 5, and similar to the keyword-based structure described below in reference to FIG. 9. In step 706, any corresponding preceding words associated with a corresponding keyword, and a mapping from any corresponding preceding words to a corresponding word phrase, are stored in a map for each word in the phrase-based structure. Each keyword has a map to preceding words—there could be thousands—and for each preceding word there is a list of corresponding phrases. Preceding words are stored for each word that appears in the second or later position of a phrase. An example of preceding words and their mapping to corresponding word phrases is depicted in FIG. 9 as part of the keyword-based structure described below in reference to FIG. 9. Such a map of preceding words enables efficient matching of large sets of words, as described in more detail in Section 10 below. In step 708, a word string is input.

If a word from the input word string does not match a keyword in the keyword table in step 710, the next word is retrieved and the comparison step 710 is repeated with the next word, provided that the input word string has more words. If there are no more words in the input word string, then the process 700 goes to step 720 to determine if any previous comparisons identified any of the phrases in the word string.

If the word matches a keyword in the keyword table in step 710, then a determination is made in step 712 whether any of the preceding words listed for the keyword is the preceding word in the input word string. In none of the preceding words listed for the keyword is the preceding word in the input word string, then the process returns to step 710 to see if there are more words in the input word string to analyze, the next word is retrieved and the comparison step 710 is repeated with the next word, provided that the input word string has more words.

If any of the preceding words listed for the keyword is the preceding word in the input word string, then a determination may be made in step 714 whether the use of the word from the input word string is consistent with the attributes represented by a keyword table value for the keyword. If the use of the word from the input word string is not consistent with the attributes represented by the keyword table value for the keyword, then the next keyword table value is retrieved for the keyword if more keyword table values are present for the keyword, and evaluated in step 714 If there are no more keyword table values in step 714, then the process returns to step 710 to see if there are more words in the input word string to analyze, the next word is retrieved and the comparison step 710 is repeated with the next word, provided that the input word string has more words.

If the use of the word from the input word string is consistent with the attributes represented by a keyword table value for the keyword, then a determination may be made in step 716 whether the use of the word in the word string is consistent with the corresponding value from the intermediate storage array. If the use of the word in the word string is not consistent with the corresponding value from the intermediate storage array, then there is no match, and the process returns to step 710 to see if there are more words in the input word string to analyze, the next word is retrieved and the comparison step 710 is repeated with the next word, provided that the input word string has more words.

If the use of the word in the input word string is consistent with the corresponding value from the intermediate storage array, then the corresponding value from the intermediate storage array is updated in step 718 based on the matching word in the word string. After all of the words in the word string are processed, a determination is made in step 720 whether any of the phrases in the phrase-based data structure are present in the input word string based on the attributes associated with multiple matching words.

8. Building a Phrase Table for Large Sets

Phrase Table 800 of FIG. 8A includes seven phrases numbered 0 through 6, such as the phrase "John Allen" as phrase 0 and the phrase "John.* .* Smith" as phrase 1. These phrases are search phrases that may be encountered by an application, for example, as found by an application when searching documents for entities. This is only intended as an illustrative example, as there are many common expressions or phrases that can be generated by a computer operating system, an application, a peripheral device, a network, or virtually any other computing device or person generating text, such as a newsfeed, and the techniques described herein have broad applicability to any need for phrase recognition in such applications. One or more sets of search phrases may be developed and stored in a database, for example, to use for analysis of input word strings.

The phrases listed in table 800 of FIG. 8A may be sorted alphabetically, resulting in the sorted list of phrases shown in table 820 of FIG. 8B. Further, the alpha-sorted phrases in FIG. 8B may be further simplified by removing common terms from subsequent phrases, resulting in the sorted simplified list shown in table 840 of FIG. 8C, where a common non-alphanumeric symbol, such as a dash character "--", replaces the redundant terms in similar phrases, for example, as shown in phrases 3 and 4 in FIG. 8C.

The use of the dash character "--" replaces redundancy in similar phrases, and indicates a branch condition. For example, rather than have a single letter correspond to a single node as in a simple tree, at least an entire word or phrase may correspond to a single node.

9. Building a Keyword Table for Large Sets

From the sorted simplified list shown in FIG. 8C, a keyword table can be built as shown in table 900 in FIG. 9, with each word from the phrases shown in FIG. 9C being indexed as a keyword in the keyword table. The corresponding value for each keyword is shown as a list of bracketed values, for example, [a,b,c,d,e], the values representing attributes of the words of the search phrases. In one example, the list entries [a,b,c,d,e] are specified as [a] the phrase number containing the word; except, if the word is the first word in the phrase, then the phrase number will be set equal to "−1" as a special designator; [b] the position of the word in the phrase; [c] the branch phrase number; [d] whether the word is the terminal word in the phrase; and [e] and the number of arbitrary words which the word follows, which may be represented by the characters ".*" In contrast to the process 300, in which the attribute e specifies whether the word follows any arbitrary words, here the attribute e specifies the specific number of arbitrary words that the word follows, such that the process 700 evaluates numbers instead of a true/false Boolean for the fifth value represented by the attribute e.

The third data row of the keyword table stores the keyword "Corporation," the corresponding value "[1,2,1,t,0], and the preceding words "Allen Smith," which is mapped to phrase "(1)." FIG. 9 includes a "callout box" 902 which describes each attribute of the keyword table value for the keyword "Corporation." Thus, the first value "1" indicates that "Corporation" appears in the second phrase in FIG. 8C; the second value "2" indicates that "Corporation" is the third word in that phrase; the third value "1" indicates that "Corporation" appears in the second branch, or the second phrase; the fourth value "t" indicates that "Corporation" is the terminal word in the phrase; and the fifth value "0" indicates that "Corporation" follows zero arbitrary words. One or more keyword tables can thus be constructed to index lists of search phrases, for example, to facilitate processing for a computing application, such as database management.

10. Example Analysis of Word Strings for Large Sets

In order to analyze an input word string of words using the keyword table(s), a match-based array is defined to store intermediate values. For example, the array phrases[ ] may be defined for use with the phrase table 840 of FIG. 8C and the keyword table 900 of FIG. 9. Since there are 7 phrases in the phrase table 840, the array will be defined to have a length of 7, and each position in the array will be indexed to a phrase in the phrase table. Further, each position of the array will have a value [x,y,z], where x=the sentence number for the input word string (where each new sentence has a subsequent value, starting with 1), y=the position of the word in the search phrase, and z=the position of the word in the input word string. For the sake of brevity and ease of handling, the array may be initialized with objects [0,0,0] in all positions.

For an example, the following input word string is received from document search results: "the John Allen Smith Corporation." This string may be analyzed one word at a time against the keywords stored in the keyword table of FIG. 9 using the process 700, and the progress of such analysis is illustrated with reference to FIGS. 10A-10F. As noted above, the intermediate array phrases[ ] may be initialized with object values [0,0,0] in all positions, as shown in FIG. 10A.

The first word in the input word string is "the," and since this word does not appear as a keyword in the keyword table, it is ignored and the next word in the input word string is evaluated. All values in the array phrases[ ] remain unchanged as shown in FIG. 10B.

The second word in the input word string is "John" and is located as a keyword in the keyword table with one value entry, indicating that the word "John" appears in one phrase in the phrase table of FIG. 8C. The value entry for "John" in the keyword table is [−1,0,2,f,0]. This value indicates that the word "John" is in the first position in the third phrase, which could be correct, and therefore the value [1,0,1] is stored to phrases[2] as shown in FIG. 10C. That is, the intermediate array is updated at phrases[2] to keep track of the possible use of "John" in the first input word string as the first word of a phrase, as well as the fact that the word is in the second position of the input word string. The array keeps track of possible matches, depending on what follows, with the third phrase, where "John" is the first word in the phrase.

The third word in the input word string is "Allen." The word "Allen" is located in the keyword table with the values of [0,1,0,t,0], [−1,0,1,f,0], [2,1,2,t,0], [5,2,5,t,1], and [6,1,6,t,0] and with the preceding word "Albert" mapped to the phrase "(0)," the preceding word "John" mapped to the phrase "(2)," the preceding word "Robert" mapped to the phrase "(5)," and the preceding word "Samuel" mapped to the phrase "(6)." Since the word "John" precedes the word "Allen" in the input word string, the word "John" is searched for in the preceding words for the keyword "Allen," and identified as mapped to the phrase "(2)." Therefore, out of the four values of [0,1,0,t,0], [2,1,2,t,0], [5,2,5,t,1], and [6,1,6,t,0] for which the word "Allen" is in the second position or later position in the corresponding phrase, the only value that needs to be evaluated is [2,1,2,t,0], which corresponds to phrase 2, in which the word "Allen" is preceded by the word "John." This value [2,1,2,t,0] indicates that the word "Allen" is in the second position in the third phrase, is the terminal word of the phrase, and does not follow any arbitrary words, all of which could be correct.

Therefore, phrases[2] is examined, which has the value [1,0,1]. The value of phrases[2] indicates that the possible matching word "Allen" should be the second word in the phrase, which is consistent with the third phrase in FIG. 8C. Consequently, all of the attributes are consistent with a match for the third phrase, phrases[2]="John Allen" and no changes are made to the array phrases[2], as shown in FIG. 6D, but the phrase 2 is recorded as having been matched. Since the word "John" is the initial word in the third phrase and the word "Allen" is the terminal word in the third phrase, with no possible arbitrary words between them, and the input word string has the word "John" followed by no arbitrary words which are followed by the word "Allen," the words in the input word string from "John" to "Allen" are a complete match for the third phrase, such that no words before "John" or after "Allen" need to be identified to match the third phrase.

In this simplified example, 3 out of 4 values for the phrases which include the word "Allen" outside of the first position of the phrase do not have to be evaluated, which may initially appear to be a relatively insignificant improvement in efficiency. However, in a production database, the word "Allen" may be in 1,000 phrases, only 2 of which contain the word "John" anywhere before the word "Allen." The process 300 would have had to evaluate the 1,000 values for the 1,000 phrases which include the word "Allen," whereas the process 700 would only evaluate the 2 values for the 2 phrases in which include the word "Allen" is preceded by the word "John." This significant improvement in efficiency may occur often, such as when processing names of corporations that include very common words such as "Inc." or "Corp."

The only value entry for "Allen" in the keyword table that corresponds to the word "Allen" in the first position of a phrase is [−1,0,1,f,0]. This value indicates that the word "Allen" is in the first position for the second phrase in the phrase table of FIG. 8C. This may be true for the input word string, depending on what follows. The value phrases[1] is examined, but it still has the initialized value [0,0,0] at this point, and therefore it is updated to [1,0,2] as shown in FIG. 10D; that is, the intermediate array is updated at phrases[1] to keep track of the possible use of "Allen" in the first input word string as the first word of a phrase, as well as the fact that the word "Allen" is in the third position of the input word string.

Only because of the possible presence of arbitrary intermediary words, the value [5,2,5,t,1] is also evaluated for the word "Allen" since this value specifies that one arbitrary intermediary word is permitted before the word "Allen," and the preceding word "John" in the input word string may be interpreted as the one arbitrary intermediary word. Therefore, the word "the," which precedes the word "John" in the input word string, is evaluated as a possible preceding word for the keyword "Allen" in the sixth phrase, which requires two preceding words, including the word "Robert." However, the preceding words for the keyword "Allen" in the sixth phrase do not include the word "the," which does not match the word "Robert," such that the sixth phrase corresponding to the value [5,2,5,t,1] is not identified as a match.

The fourth word in the input word string is "Smith." The word "Smith" is located in the keyword table with the values of [1,1,1,f,0], [3,2,3,t,0], and [4,3,4,t,2] and with the preceding words "Allen" mapped to the phrase "(1)," the preceding words "John Robert" mapped to the phrase "(3)," and the preceding word "John" mapped to the phrase "(4)."

Since the word "Allen" precedes the word "Smith" in the input word string, the word "Allen" is searched for in the preceding words for the keyword "Smith," and identified as mapped to the phrase "(1)." Therefore, out of the three values of [1,1,1,f,0], [3,2,3,t,0], and [4,3,4,t,2] for which the word "Smith" is in the second position or later position in the phrase, the only value that needs to be evaluated is [1,1,1,f,0], which corresponds to phrase 1, in which the word "Smith" is preceded by the word "Allen." This value [1,1,1,f,0] indicates that the word "Smith" is in the second position in the second phrase, is not the terminal word of the phrase, and does not follow any arbitrary words, all of which could be correct.

Therefore, phrases[1] is examined, which has the value [1,0,2]. The value of phrases[1] indicates that the possible matching word "Smith" should be the second word in the phrase, which is consistent with the second phrase in FIG. 8C. However, because the matching word "Smith" is not a terminal word for the second phrase, all of the attributes are not yet consistent with a match for the second phrase, phrases[1]="Allen Smith Corporation." Therefore, the array phrases[1] is updated to the value [1,1,3], as shown in FIG. 10E, to reflect the matching through the second word of the search phrase and the fourth word of the input word string.

Only because of the possible presence of arbitrary intermediary words, the value [4,1,4,t,2] is also evaluated for the word "Smith" since this value specifies that two arbitrary intermediary word are permitted before the word "Smith," and the preceding word "Allen" in the input word string may be interpreted as the second of the two arbitrary intermediary words. Therefore, the words "the" and "John," which precede the word "Allen" in the input word string, are evaluated as possible preceding words for the keyword "Smith." While the word "John" may be interpreted as the first of the two arbitrary intermediary words, the fifth phrase also requires the word "John" to precede the two arbitrary words, but the word "the" precedes the two potential arbitrary words in the input word string. Furthermore, the preceding words for the keyword "Smith" do not include the word "the," such that the fifth phrase corresponding to the value [4,1,4,t,2] is not identified as a match.

The fifth and final word in the input word string is "Corporation." The word "Corporation" is located in the keyword table with the value of [1,2,1,t,0], and with the preceding words "Allen Smith" mapped to phrase "(1). Since the word "Smith" precedes the word "Corporation" in the input word string, the word "Smith" is searched for in the preceding words for the keyword "Corporation," and identified as mapped to the phrase "(1)." Therefore, the value that needs to be evaluated is [1,2,1,t,0], which corresponds to phrase 1, in which the word "Corporation" is preceded by the word "Smith." This value [1,2,1,t,0] indicates that the word "Corporation" is in the third position in the second phrase, is the terminal word of the phrase, and does not follow any arbitrary words, all of which could be correct.

Therefore, phrases[1] is examined, which has the value [1,1,3]. The value of phrases[1] indicates that the possible matching word "Corporation" should be the third word in the phrase, which is consistent with the second phrase in FIG. 8C. Consequently, all of the attributes are consistent with a match for the second phrase, phrases[1]="Allen Smith Corporation" and no changes are made to the array phrases[1], as shown in FIG. 10F, but the phrase 1 is recorded as having been matched. The word "Allen" is the initial word in the second phrase, the word "Smith" is the intermediate word in the second phrase, and the word "Corporation" is the terminal word in the second phrase, with no possible arbitrary words between them. Likewise, the input word string has the word "Allen" followed by the word "Smith," followed by the word "Corporation," with no arbitrary words between them. Therefore, the words in the input word string from "Allen" to "Corporation" are a complete match for the second phrase, such that no words before "Allen" or after "Corporation" need to be identified to match the second phrase. Thus, the analysis has revealed that words of the input word string create a match with both the second phrase in FIG. 8C and the third phrase of FIG. 8C.

Matching large sets of words may be enhanced by using fuzzy matching if matching is done on a word by word basis and a map exists from any word to a delimited set of fuzzy matches which can be created in advance of matching, such that determining whether two words are a fuzzy match does not require a runtime comparison of the two words. The set of possible fuzzy matches can be determined quickly and then rules can be identified for the potential fuzzy matches, rather than identifying rules to determine if fuzzy matches exist. Fuzzy matching may be implemented as a simple map, which holds for words like "Rob" and "Bob" being synonyms for the word "Robert." However, for other cases, such as soundex, a word is converted into it soundex encoding, which is used to identify similar sounding words in a database based on similar soundex encodings. Words may be matched as described for the process 300 and the process 700, however the set of fuzzy matching words would also be compared.

11. Detailed System Description

FIG. 11 is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 11 (and in more detail in FIG. 12), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system. Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over multiple servers. At least as for the users that are accessing that server, each of the multiple servers has access to the data stored in the multi-tenant database system; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 11, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing multi-tenant database system processes and tenant-specific processes, such as running applications as part of an application hosting service. Additional processes that may execute on system 116 include database indexing processes.

Several elements in the system shown in FIG. 11 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an multi-tenant database system, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one multi-tenant database system is used, they may be located in close proximity to one another (e.g., in a server farm located in a single building or campus), or they may be distributed at locations remote from one another (e.g., one or more servers located in city A and one or more servers located in city B). As used herein, each multi-tenant database system could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 12 also illustrates environment 110. However, in FIG. 12 elements of system 116 and various interconnections in an embodiment are further illustrated. FIG. 12 shows that user system 112 may include processor system 1110, memory system 1111, input system 112C, and output system 112D. FIG. 12 shows network 114 and system 116. FIG. 12 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 11. Regarding user system 112, processor system 1110 may be any combination of one or more processors. Memory system 1111 may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 12, system 116 may include a network interface 115 (of FIG. 11) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned, co-pending U.S. Provisional Patent App. No. 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a multi-tenant database system arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by multiple users or all of the users for a given organization that is a tenant. Thus, there might be some data structures managed by system 116 that are allocated at the tenant level while other data structures might be managed at the user level. Because a multi-tenant database system might support multiple tenants including possible competitors, the multi-tenant database system should have security protocols that keep data, applications, and application use separate. Also, because many tenants may opt for access to a multi-tenant database system rather than maintain their own system, redundancy, up-time, and backup are additional functions that may be implemented in the multi-tenant database system. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for matching large sets of words, the system comprising:
one or more processors; and a non-transitory computer readable medium storing a plurality of instructions, which when executed, cause the one or more processors to:

store a plurality of word phrases in a phrase-based data structure;

store each word in the phrase-based data structure as a corresponding keyword in a keyword-based data structure, wherein each corresponding keyword is associated with corresponding usage attributes identifying use of a corresponding word in a corresponding word phrase in the phrase-based data structure;

store, for each word in the phrase-based data structure, any corresponding preceding words associated with a corresponding keyword, and a mapping from any corresponding preceding words to a corresponding word phrase;

determine whether a word from an inputted word string matches any keyword in the keyword-based data structure;

determine whether any corresponding preceding words associated with any matching keyword comprises a preceding word which precedes the matching word in the word string in response to a determination that the word in the word string matches any keyword in the keyword-based data structure;

update corresponding match attributes in a match-based data structure in response to a determination that any corresponding preceding words associated with any matching keyword comprises the preceding word which precedes the matching word in the word string, wherein the corresponding match attributes indicate use of the matching word in the word string and use of the matching word in a corresponding word phrase in the phrase-based data structure;

determine, based on the usage attributes and the match attributes associated with a plurality of matching words, whether at least one of the word phrases in the phrase-based data structure is present in the word string.

2. The system of claim 1, wherein at least one word phrase in the phrase-based data structure comprises a specified number of arbitrary words between words, and wherein any arbitrary words are ignored when identifying a preceding word.

3. The system of claim 1, wherein the usage attributes comprise a numerical identifier of a corresponding word phrase in the phrase-based data structure, a position of a corresponding word in the corresponding word phrase; whether the corresponding word is a terminal word in the corresponding word phrase, and a number of arbitrary words which the corresponding word follows.

4. The system of claim 1, wherein the match attributes comprise: a numerical identifier of the word string, a position of a corresponding word in a corresponding word phrase, and a position of the corresponding word in the word string.

5. The system of claim 1, wherein the match-based data structure comprises an array having a length equal to a total number of word phrases in the phrase-based data structure, and an index corresponding to the total number of word phrases in the phrase-based data structure.

6. The system of claim 1, comprising further instructions, which when executed, cause the one or more processors to determine whether corresponding usage attributes associated with any matching keyword identify the use of the word in the word string in response to a determination that any corresponding preceding words associated with any matching keyword comprises the preceding word which precedes the matching word in the word string.

7. The system of claim 1, comprising further instructions, which when executed, cause the one or more processors to determine whether corresponding match attributes in the match-based data structure are consistent with the use of the matching word in the word string in response to a determination that corresponding usage attributes associated with any matching keyword identify the use of the word in the word string.

8. A computer program product comprising computer-readable program code to be executed by one or more processors when retrieved from a non-transitory computer-readable medium, the program code including instructions to:

store a plurality of word phrases in a phrase-based data structure;

store each word in the phrase-based data structure as a corresponding keyword in a keyword-based data structure, wherein each corresponding keyword is associated with corresponding usage attributes identifying use of a corresponding word in a corresponding word phrase in the phrase-based data structure;

store, for each word in the phrase-based data structure, any corresponding preceding words associated with a corresponding keyword, and a mapping from any corresponding preceding words to a corresponding word phrase;

determine whether a word from an inputted word string matches any keyword in the keyword-based data structure;

determine whether any corresponding preceding words associated with any matching keyword comprises a preceding word which precedes the matching word in the word string in response to a determination that the word in the word string matches any keyword in the keyword-based data structure;

update corresponding match attributes in a match-based data structure in response to a determination that any corresponding preceding words associated with any matching keyword comprises the preceding word which precedes the matching word in the word string, wherein the corresponding match attributes indicate use of the matching word in the word string and use of the matching word in a corresponding word phrase in the phrase-based data structure;

determine, based on the usage attributes and the match attributes associated with a plurality of matching words, whether at least one of the word phrases in the phrase-based data structure is present in the word string.

9. The computer program product of claim 8, wherein at least one word phrase in the phrase-based data structure comprises a specified number of arbitrary words between words, and wherein any arbitrary words are ignored when identifying a preceding word.

10. The computer program product of claim 8, wherein the usage attributes comprise a numerical identifier of a corresponding word phrase in the phrase-based data structure, a position of a corresponding word in the corresponding word phrase; whether the corresponding word is a terminal word in the corresponding word phrase, and a number of arbitrary words which the corresponding word follows.

11. The computer program product of claim 8, wherein the match attributes comprise: a numerical identifier of the word string, a position of a corresponding word in a corresponding word phrase, and a position of the corresponding word in the word string.

12. The computer program product of claim 8, wherein the match-based data structure comprises an array having a length equal to a total number of word phrases in the phrase-based data structure, and an index corresponding to the total number of word phrases in the phrase-based data structure.

13. The computer program product of claim 8, wherein the program code comprises further instructions to determine whether corresponding usage attributes associated with any matching keyword identify the use of the word in the word string in response to a determination that any corresponding preceding words associated with any matching keyword comprises the preceding word which precedes the matching word in the word string.

14. The computer program product of claim 8, wherein the program code comprises further instructions to determine whether corresponding match attributes in the match-based data structure are consistent with the use of the matching word in the word string in response to a determination that corresponding usage attributes associated with any matching keyword identify the use of the word in the word string.

15. A method for matching large sets of words, the method comprising:
   storing a plurality of word phrases in a phrase-based data structure;
   storing each word in the phrase-based data structure as a corresponding keyword in a keyword-based data structure, wherein each corresponding keyword is associated with corresponding usage attributes identifying use of a corresponding word in a corresponding word phrase in the phrase-based data structure;
   storing, for each word in the phrase-based data structure, any corresponding preceding words associated with a corresponding keyword, and a mapping from any corresponding preceding words to a corresponding word phrase;
   determining whether a word from an inputted word string matches any keyword in the keyword-based data structure;
   determining whether any corresponding preceding words associated with any matching keyword comprises a preceding word which precedes the matching word in the word string in response to a determination that the word in the word string matches any keyword in the keyword-based data structure;
   updating corresponding match attributes in a match-based data structure in response to a determination that any corresponding preceding words associated with any matching keyword comprises the preceding word which precedes the matching word in the word string, wherein the corresponding match attributes indicate use of the matching word in the word string and use of the matching word in a corresponding word phrase in the phrase-based data structure;
   determining, based on the usage attributes and the match attributes associated with a plurality of matching words, whether at least one of the word phrases in the phrase-based data structure is present in the word string.

16. The method of claim 15, wherein at least one word phrase in the phrase-based data structure comprises a specified number of arbitrary words between words, and wherein any arbitrary words are ignored when identifying a preceding word.

17. The method of claim 15, wherein the usage attributes comprise a numerical identifier of a corresponding word phrase in the phrase-based data structure, a position of a corresponding word in the corresponding word phrase; whether the corresponding word is a terminal word in the corresponding word phrase, and a number of arbitrary words which the corresponding word follows.

18. The method of claim 15, wherein the match attributes comprise: a numerical identifier of the word string, a position of a corresponding word in a corresponding word phrase, and a position of the corresponding word in the word string.

19. The method of claim 15, wherein the match-based data structure comprises an array having a length equal to a total number of word phrases in the phrase-based data structure, and an index corresponding to the total number of word phrases in the phrase-based data structure.

20. The method of claim 15, wherein the method further comprises:
   determining whether corresponding usage attributes associated with any matching keyword identify the use of the word in the word string in response to a determination that any corresponding preceding words associated with any matching keyword comprises the preceding word which precedes the matching word in the word string; and
   determining whether corresponding match attributes in the match-based data structure are consistent with the use of the matching word in the word string in response to a determination that corresponding usage attributes associated with any matching keyword identify the use of the word in the word string.

* * * * *